US012609351B2

(12) United States Patent
Fujii et al.

(10) Patent No.: US 12,609,351 B2
(45) Date of Patent: Apr. 21, 2026

(54) SULFIDE SOLID ELECTROLYTE AND METHOD FOR MANUFACTURING SAME

(71) Applicant: AGC Inc., Tokyo (JP)

(72) Inventors: Naoki Fujii, Tokyo (JP); Kosho Akatsuka, Tokyo (JP); Manabu Nishizawa, Tokyo (JP); Hideaki Hayashi, Tokyo (JP)

(73) Assignee: AGC Inc., Tokyo (JP)

( * ) Notice: Subject to any disclaimer, the term of this patent is extended or adjusted under 35 U.S.C. 154(b) by 504 days.

(21) Appl. No.: 18/297,906

(22) Filed: Apr. 10, 2023

(65) Prior Publication Data

US 2023/0246227 A1    Aug. 3, 2023

Related U.S. Application Data

(63) Continuation of application No. PCT/JP2021/037974, filed on Oct. 13, 2021.

(30) Foreign Application Priority Data

Oct. 13, 2020    (JP) ................................. 2020-172693

(51) Int. Cl.
    *H01M 10/0562*    (2010.01)
    *H01M 10/052*    (2010.01)
    *H01M 10/0525*    (2010.01)

(52) U.S. Cl.
    CPC ..... *H01M 10/0562* (2013.01); *H01M 10/052* (2013.01); *H01M 10/0525* (2013.01); *H01M 2300/0068* (2013.01)

(58) Field of Classification Search
    CPC ......... H01M 10/0562; H01M 10/0525; H01M 2300/0068; H01M 10/052; C01B 25/14;
    (Continued)

(56) References Cited

U.S. PATENT DOCUMENTS

2015/0093652 A1*  4/2015  Aihara .............. H01M 10/0562
                                              423/303
2016/0156064 A1    6/2016  Miyashita et al.
                                  (Continued)

FOREIGN PATENT DOCUMENTS

CN        111448702 A      7/2020
EP        4 084 123 A1    11/2022
                  (Continued)

OTHER PUBLICATIONS

JP 2020119783 MT (Year: 2020).*
                  (Continued)

*Primary Examiner* — Alexander Usyatinsky
(74) *Attorney, Agent, or Firm* — Oblon, McClelland, Maier & Neustadt, L.L.P.

(57)    ABSTRACT

A sulfide solid electrolyte to be use in a lithium-ion secondary battery includes an argyrodite crystal structure represented by $Li_aPS_bHa_c$ (where $5 \leq a \leq 7$, $4 \leq b \leq 6$, and $0 < c \leq 2$, and Ha represents a halogen element), in which in an X-ray diffraction spectrum using a Cu-Kα ray, the argyrodite crystal structure has a peak A and a peak B, each having a full width at half maximum of 0.07° or more, within a range of $2\theta = 30.3° \pm 0.5°$, and a difference between diffraction angles ($2\theta$) of the peak A and the peak B is 0.05° or more.

6 Claims, 2 Drawing Sheets

(58) Field of Classification Search

CPC .. C01D 15/00; C01P 2002/60; C01P 2002/72; C01P 2002/74; C01P 2004/45; C01P 2004/61; C01P 2006/40; H01B 1/06; Y02E 60/10

See application file for complete search history.

(56) References Cited

U.S. PATENT DOCUMENTS

| | | | |
|---|---|---|---|
| 2017/0187066 A1 | 6/2017 | Tsujimura et al. | |
| 2017/0229732 A1 | 8/2017 | Kanno et al. | |
| 2018/0069262 A1* | 3/2018 | Utsuno | H01M 10/0562 |
| 2018/0138546 A1 | 5/2018 | Sung et al. | |
| 2018/0166740 A1 | 6/2018 | Iwasaki et al. | |
| 2018/0366777 A1 | 12/2018 | Sasaki | |
| 2019/0074544 A1 | 3/2019 | Senga et al. | |
| 2020/0087155 A1 | 3/2020 | Rupert | |
| 2020/0381772 A1 | 12/2020 | Kim et al. | |
| 2021/0020984 A1 | 1/2021 | Ito et al. | |
| 2021/0119252 A1 | 4/2021 | Sung et al. | |
| 2022/0006117 A1* | 1/2022 | Takahashi | H01M 10/0562 |
| 2022/0109184 A1 | 4/2022 | Tsujimura et al. | |
| 2023/0037508 A1 | 2/2023 | Nakayama et al. | |

FOREIGN PATENT DOCUMENTS

| | | | |
|---|---|---|---|
| JP | 6-115911 A | 4/1994 | |
| JP | 2012-43646 A | 3/2012 | |
| JP | 2012-43654 A | 3/2012 | |
| JP | 2012-54212 A | 3/2012 | |
| JP | 2013-137889 A | 7/2013 | |
| JP | 2013-211171 A | 10/2013 | |
| JP | 2014-216217 A | 11/2014 | |
| JP | 2015-232965 A | 12/2015 | |
| JP | 2017-117753 A | 6/2017 | |
| JP | 2017-142948 A | 8/2017 | |
| JP | 2017-199631 A | 11/2017 | |
| JP | 2018-45997 A | 3/2018 | |
| JP | 2018-49834 A | 3/2018 | |
| JP | 2018-81914 A | 5/2018 | |
| JP | 2018-97954 A | 6/2018 | |
| JP | 2019-71210 A | 5/2019 | |
| JP | 2019-160625 A | 9/2019 | |
| JP | 2019-169459 A | 10/2019 | |
| JP | 2020-27715 A | 2/2020 | |
| JP | 2020-119783 A | 8/2020 | |
| JP | 2020119783 | * | 8/2020 |
| KR | 10-1952196 B1 | 2/2019 | |
| KR | 2020-0000849 A | 1/2020 | |
| WO | WO 2015/012042 A1 | 1/2015 | |
| WO | WO 2018/218057 A2 | 11/2018 | |
| WO | WO 2020/050269 A1 | 3/2020 | |
| WO | WO 2020/095937 | * | 5/2020 |
| WO | WO 2020/095937 A1 | 5/2020 | |

OTHER PUBLICATIONS

The decision of JPO to grant a Patent for Application JP 2024001902 (Year: 2025).*

Extended European Search Report issued Jul. 24, 2024, in corresponding European Patent Application No. 21837335.5, 9 pages.

Extended European Search Report issued Aug. 5, 2024, in corresponding European Patent Application No. 21836933.8, 10 pages.

Yu Chuang et al: "Facile Synthesis toward the Optimal Structure-Conductivity Characteristics of the Argyrodite $Li_6PS_5Cl$ Solid-State Electrolyte", Applied Materials & Interfaces, vol. 10, No. 39, Sep. 10, 2018, pp. 33296-33306.

Ting Chen et al: "Argyrodite Solid Electrolyte with a Stable Interface and Superior Dendrite Suppression Capability Realized by ZnO Co-Doping", Applied Materials & Interfaces, vol. 11, No. 43, Oct. 30, 2019, pp. 40808-40816, URL:https://pubs.acs.org/doi/pdf/10.1021/acsami.9b13313>.

International Search Report issued Dec. 28, 2021 in PCT/JP2021/037974 filed on Oct. 13, 2021, 2 pages.

International Search Report issued Sep. 28, 2021 in PCT/JP2021/025677 filed on Jul. 7, 2021, 3 pages.

International Search Report issued Oct. 12, 2021 in PCT/JP2021/028382 filed on Jul. 30, 2021, 2 pages.

International Search Report issued Sep. 28, 2021 in PCT/JP2021/025673 filed on Jul. 7, 2021, 3 pages.

Zhang et al., "Enhancing ionic conductivity of solid electrolyte by lithium substitution in halogenated Li-Argyrodite" Journal of Power Sources, 2019, vol. 450, 227601, 7 pages.

Kraft et al., "Influence of Lattice Polarizability on the Ionic Conductivity in the Lithium Superionic Argyrodites $Li_6PS_5X$ (X=Cl, Br, I)" Journal of the American Chemical Society, Figure 1, 2017, 139, pp. 10909-10918.

Extended European Search Report issued Sep. 18, 2024, In corresponding European Patent Application No. 21849673.5, 8 pages.

Extended European Search Report issued Sep. 25, 2024, in corresponding European Patent Application No. 21880172.8, 9 pages.

Office Action mailed Nov. 26, 2025 in co-pending U.S. Appl. No. 18/159,733, 21 pages.

* cited by examiner

SULFIDE SOLID ELECTROLYTE AND METHOD FOR MANUFACTURING SAME

CROSS-REFERENCE TO RELATED APPLICATIONS

This is a bypass continuation of International Patent Application No. PCT/JP2021/037974, filed on Oct. 13, 2021, which claims priority to Japanese Patent Application No. 2020-172693, filed on Oct. 13, 2020. The contents of these applications are hereby incorporated by reference in their entireties.

TECHNICAL FIELD

The present invention relates to a sulfide solid electrolyte to be use for a lithium-ion secondary battery and a method for manufacturing the sulfide solid electrolyte.

BACKGROUND ART

Lithium ion secondary batteries are widely used for a portable electronic device such as a mobile phone and a notebook computer.

In the past, a liquid electrolyte has been used in a lithium-ion secondary battery, but there is a concern of liquid leakage, ignition, and the like, and it has been necessary to increase the size of a case for safety design. It has also been desired to improve the battery life and the operating temperature range.

In contrast, attention has been paid to an all-solid-state lithium-ion secondary battery in which a solid electrolyte is used as an electrolyte of a lithium-ion secondary battery, from the viewpoint of improving safety, charge and discharge at a high speed, and reducing the size of a case.

The solid electrolytes are roughly classified into sulfide solid electrolytes and oxide solid electrolytes. The sulfide ions constituting the sulfide solid electrolytes have higher polarizability and higher ion conductivity than those of the oxide ions constituting the oxide solid electrolytes. As the sulfide solid electrolytes, LGPS crystals such as $Li_{10}GeP_2S_{12}$, argyrodite crystals such as $Li_6PS_5Cl$, LPS crystallized glasses such as $Li_7P_3S_{11}$ crystallized glass, and the like have been known.

Patent Literature 1 discloses an argyrodite sulfide solid electrolyte. The sulfide solid electrolyte disclosed in Patent Literature 1 has a cubic crystal structure belonging to a space group F-43m, and contains a compound represented by a composition formula: $Li_{7-x}PS_{6-x}Ha_X$ (where Ha represents Cl or Br) (where x=0.2 to 1.8), and a lightness L value of an $L^*a^*b^*$ color system is 60.0 or more. This is intended to improve the charge/discharge efficiency and the cycle characteristics by increasing the lithium ion conductivity and decreasing the electron conductivity.

Patent Literature 1: WO2015/012042

SUMMARY OF INVENTION

A sulfide solid electrolyte containing an argyrodite crystal can achieve a high lithium ion conductivity because the sulfide solid electrolyte contains a halogen element. On the other hand, the halide is highly corrosive, and in the case where the amount of the halogen element contained in the sulfide solid electrolyte is too large, a metal constituting the lithium-ion secondary battery may be corroded.

An object of the present invention is to provide a sulfide solid electrolyte to be use in a lithium-ion secondary battery that exhibits a high lithium ion conductivity even in the case where an element ratio of a halogen element in an argyrodite crystal is set to a certain value or less, and a method for manufacturing the sulfide solid electrolyte.

As a result of intensive studies, the present inventors have found that the above problems can be solved by providing a sulfide solid electrolyte having an argyrodite crystal structure having a specific peak in an X-ray diffraction spectrum, and have completed the present invention.

That is, the present invention relates to the following [1] to [7].

[1] A sulfide solid electrolyte to be use in a lithium-ion secondary battery, the sulfide solid electrolyte including
an argyrodite crystal structure represented by $Li_aPS_bHa_c$ (where 5≤a≤7, 4≤b≤6, and 0<c≤2, and Ha represents a halogen element), in which
an X-ray diffraction spectrum using a Cu-Kα ray has a peak A and a peak B, each having a full width at half maximum of 0.07° or more, within a range of 2θ=30.3°±0.5°, and
a difference between diffraction angles (2θ) of the peak A and the peak B is 0.05° or more.

[2] The sulfide solid electrolyte according to [1], in which a peak C is further present between the peak A and the peak B.

[3] The sulfide solid electrolyte according to [1] or [2], in which the peak A and the peak B are peaks derived from two argyrodite crystal structures having lattice constants different from each other by 0.02 Λ or more.

[4] The sulfide solid electrolyte according to any one of [1] to [3], in which, in an X-ray diffraction spectrum using a Cu-Kα ray after a heat treatment is performed at a temperature of 400° C. or higher and a thermal decomposition temperature or lower for 1 hour, at least one phenomenon of a decrease in a peak intensity ratio of the peak A, an increase in a peak intensity ratio of the peak B, and an appearance of a peak C or an increase in a peak intensity ratio of the peak C is observed, and
the peak C exists on a higher angle side than the peak A and on a lower angle side than the peak B.

[5] A sulfide solid electrolyte to be use in a lithium-ion secondary battery, the sulfide solid electrolyte including
an argyrodite crystal structure represented by $Li_aPS_bHa_c$ (where 5≤a≤7, 4≤b≤6, and 0<c≤2, and Ha represents a halogen element), in which
an X-ray diffraction spectrum using a Cu-Kα ray has a peak D and a peak E, each having a full width at half maximum of 0.07° or more, within a range of 2θ=30.3°±0.5°,
a difference between diffraction angles (2θ) of the peak D and the peak E is 0.02° to 0.4°, and
the X-ray diffraction spectrum is not changed even if a heat treatment is performed at a temperature of 400° C. or higher and a thermal decomposition temperature or lower for 1 hour.

[6] A method for manufacturing a sulfide solid electrolyte to be use in a lithium-ion secondary battery, the method including:
mixing raw materials including Li, P, S and Ha, and heating and melting the raw materials; and
then performing crystallization by rapid cooling under a normal pressure, in which
the Ha represents a halogen element, and
the sulfide solid electrolyte includes two or more different argyrodite crystal structures each represented by $Li_aPS_bHa_c$ (where 5≤a≤7, 4≤b≤6, and 0<c≤2, and Ha represents a halogen element).

[7] The method for manufacturing a sulfide solid electrolyte according to [6], further including performing a heat treatment at 200° C. to 600° C. for 0.1 hours to 10 hours after the crystallization.

According to the sulfide solid electrolyte according to the present invention, a high lithium ion conductivity can be achieved even in the case where an element ratio of a halogen element in the argyrodite crystal is a certain value or less. Therefore, the sulfide solid electrolyte is very useful as a solid electrolyte for a lithium-ion secondary battery, and accordingly, it is expected to improve the battery characteristics of the lithium-ion secondary battery.

DESCRIPTION OF EMBODIMENTS

Figure 1:
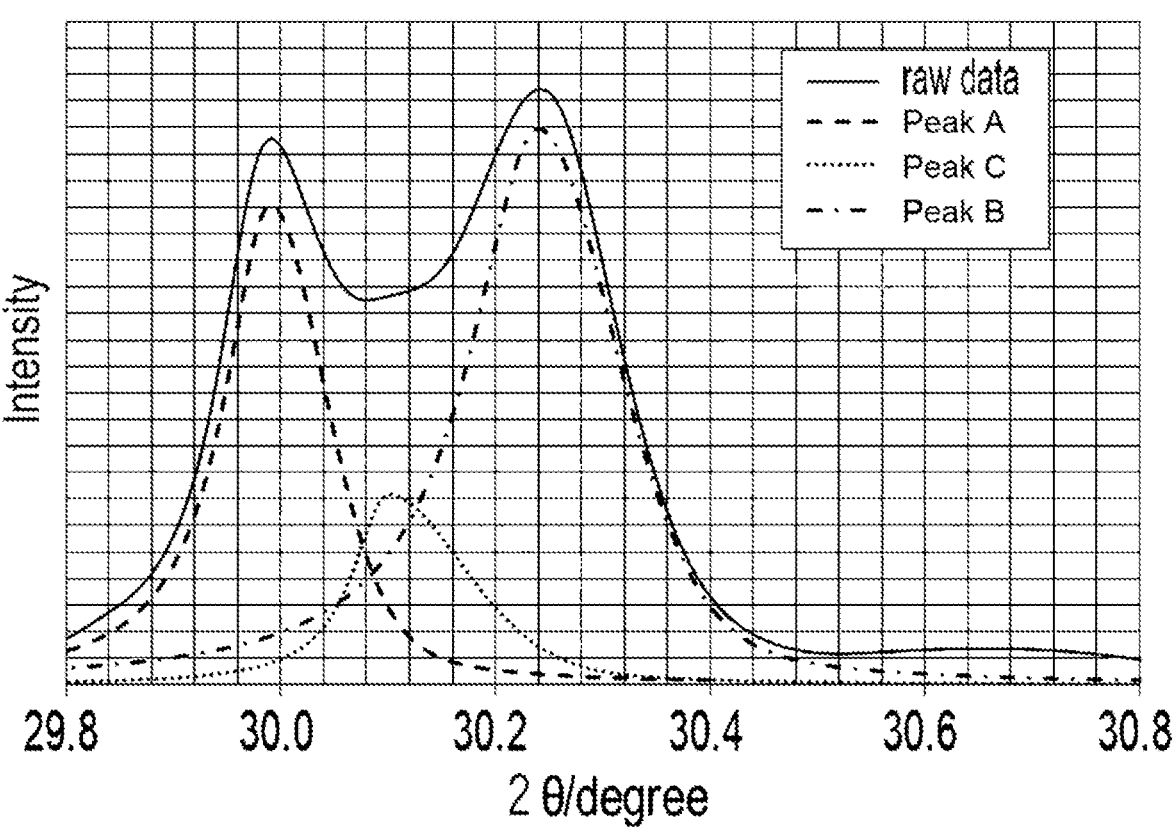
FIG. 1 is a part of an XRD spectrum of a solid electrolyte in Example 1.

Hereinafter, the present invention will be described in detail, but the present invention is not limited to the following embodiments, and can be freely modified and implemented without departing from the gist of the present invention. In addition, the symbol "-" or the word "to" includes the numerical values before and after the symbol or the word as the upper limit and the lower limit of the range, respectively.

<Sulfide Solid Electrolyte>

The sulfide solid electrolyte according to the present embodiment (hereinafter, may be simply referred to as a "solid electrolyte") is used for a lithium-ion secondary battery and has an argyrodite crystal structure. When the argyrodite crystal structure is represented by $Li_aPS_bHa_c$, the element ratios satisfy the relationships of $5 \leq a \leq 7$, $4 \leq b \leq 6$, and $0 < c \leq 2$. Ha represents a halogen element.

The solid electrolyte according to the present embodiment has a peak A and a peak B within a range of $2\theta = 30.3° \pm 0.5°$ in an X-ray diffraction (XRD) spectrum using a Cu-Kα ray. For convenience, a peak on a low angle side is defined as the peak A, and a peak on a high angle side is defined as the peak B. A difference between diffraction angles ($2\theta$) of the peak A and the peak B is 0.05° or more. The full width at half maximum of each of the peak A and the peak B is 0.07° or more.

The argyrodite crystal structure represented by $Li_aPS_bHa_c$ (where $5 \leq a \leq 7$, $4 \leq b \leq 6$, and $0 < c \leq 2$) contains Li, P, S, and Ha. Ha represents a halogen element and represent at least one halogen element selected from the group consisting of F, Cl, Br, and I.

In an XRD spectrum using a Cu-Kα ray, the solid electrolyte according to the present embodiment has the peak A and the peak B in order from the low angle side within a range of $2\theta = 30.3° \pm 0.5°$. The difference between diffraction angles ($2\theta$) of these peaks is 0.05° or more. This means that the solid electrolyte has two or more argyrodite crystal structures having different compositions.

The solid electrolyte having two or more argyrodite crystal structures is different from a mixture of two or more powders having argyrodite crystal structures having different compositions. This can be distinguished by the full width at half maximum of the peak A and the peak B.

Specifically, regarding the solid electrolyte according to the present embodiment, the full width at half maximum of each of the peak A and the peak B is 0.07° or more in the XRD spectrum. On the other hand, in the mixture of two or more powders having argyrodite crystal structures with different compositions, the full width at half maximum of the peaks in the XRD spectrum is less than 0.07°. That is, the solid electrolyte according to the present embodiment is not a mixture in which the crystals coexist on the order of mm or μm, but a solid electrolyte in which two or more argyrodite crystals coexist on the order of several hundreds of nm or several tens of nm. The full width at half maximum of the peak will be described later.

In the case where two or more argyrodite crystals coexist on the order of several hundreds of nm or several tens of nm, a high lithium ion conductivity can be achieved even in the case where the element ratio of the halogen element represented by c in the formula of $Li_aPS_bHa_c$ (where $5 \leq a \leq 7$, $4 \leq b \leq 6$, and $0 < c \leq 2$) is a low value of 2 or less.

Although the reason for this is not clear, the solid electrolyte according to the present embodiment is achieved in the case where an argyrodite crystal is obtained through a melting step and cooling thereafter during the production of the solid electrolyte. In the cooling process from a molten state, it is presumed that the seed crystal first precipitated is a high-temperature stable phase. Therefore, it is considered that, in an argyrodite crystal in which the seed crystal is grown as a nucleus, the presence site of a lithium ion, a sulfur anion, and a halogen anion is different from that of a crystal produced by an ordinary solid-phase reaction, and the presence site affects the lithium ion conductivity. In general, the high-temperature stable phase tends to have a high lithium ion conductivity, but in the argyrodite crystal in the present embodiment, a multi-composition argyrodite crystal containing the high-temperature stable phase is precipitated in the cooling process from the molten state. Therefore, it is considered that a high lithium ion conductivity can be achieved.

The fact that two or more argyrodite crystals coexist not on the order of mm or μm but on the order of several hundreds of nm or several tens of nm can be confirmed from the value of the full width at half maximum of the peaks and also from the XRD spectra before and after a heat treatment to the obtained solid electrolyte.

Specifically, as long as at least one phenomenon of a phenomenon in which a peak intensity ratio of the peak A decreases, a phenomenon in which a peak intensity ratio of the peak B increases, and a phenomenon in which a peak C appears or a phenomenon in which a peak intensity ratio of the peak C increases is observed after the heat treatment is performed for 1 hour at a temperature of 400° C. or higher and the thermal decomposition temperature of the solid electrolyte or lower, it can be said that two or more argyrodite crystals coexist on the order of several hundreds of nm or several tens of nm. Here, the peak C is a peak existing on a higher angle side than the peak A and on a lower angle side than the peak B.

The phenomenon in which the peak intensity ratio of the peak A decreases includes a phenomenon in which the peak A disappears. In addition, the phenomenon in which the peak intensity ratio of the peak C increases due to the heat treatment is based on the premise that the peak C is observed before the heat treatment. The phenomenon in which the peak C newly appears due to the heat treatment is based on the premise that the peak C is not observed before the heat treatment.

On the other hand, in the case of the powder having argyrodite crystal structures with different compositions, that is, the mixture on the order of mm or μm, the changes as described above are not observed in the XRD pattern even in the case where the same heat treatment is performed.

Figure 2:
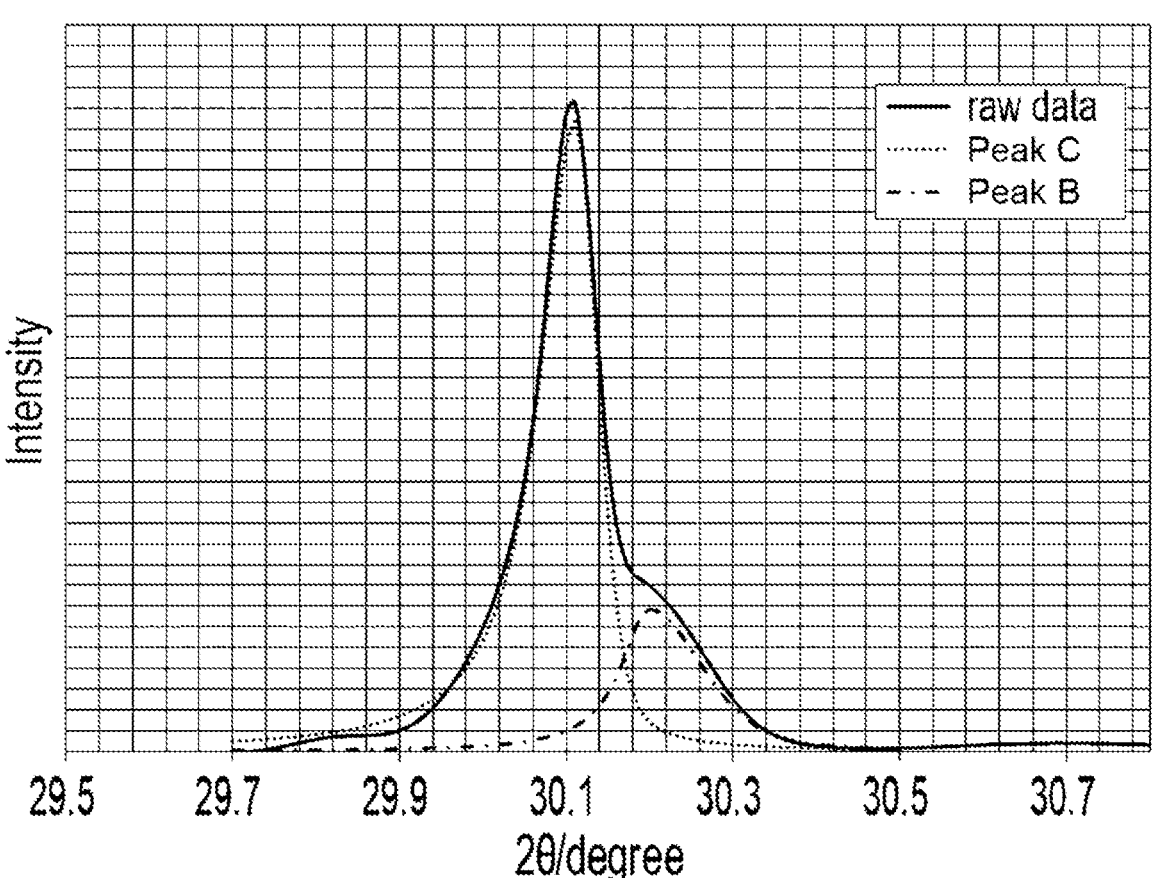
FIG. 2 is a part of an XRD spectrum of a solid electrolyte in Example 2.

As an example, FIG. 1 shows a spectrum around $2\theta = 30.3°$ in an XRD spectrum of Example 1 described later, and FIG. 2 shows a spectrum around $2\theta = 30.3°$ in an XRD spectrum of Example 2 described later. Example 2 is a solid electrolyte obtained by heat-treating the solid electrolyte obtained in Example 1 at 500° C. for 1 hour. The XRD spectra shown in FIGS. 1 and 2 are obtained by removing a diffraction pattern generated by a Cu-Kα2 ray in the Cu-Kα rays as a radiation source. Details of the removal of the diffraction pattern generated by the Cu-Kα2 ray will be described later together with a method of peak separation.

In the XRD spectrum before the heat treatment in FIG. 1, a peak at $2\theta = 29.99°$ corresponding to the peak A and a peak at $2\theta = 30.24°$ corresponding to the peak B are clearly observed based on raw data indicated by a solid line, that is, an unprocessed spectrum. However, when peaks are actually separated by analysis, a peak indicated by a dotted line exists at 30.11° in a vicinity of $2\theta = \{(\text{peak A} + \text{peak B})/2\}$, in addition to the peak A indicated by a broken line and the peak B indicated by an alternate long and short dash line. The peak corresponds to the peak C. By performing the analysis in this manner, the peaks can be separated into three peaks that are the peak A, the peak B, and the peak C. The method of peak separation will be described later.

In Example 1, a peak is also observed at $2\theta = 30.66°$. Although the detailed assignment of the peak is difficult to find, it is considered that the peak is a peak of a crystal whose symmetry is reduced as compared with the cubic argyrodite crystal or a peak of the cubic argyrodite crystal whose lattice constant is decreased due to the loss of lithium or the like. The solid electrolyte according to the present embodiment may have such a peak in addition to the peak A, peak B, and peak C.

In contrast, in the XRD spectrum after the heat treatment at 500° C. for 1 hour in FIG. 2, one sharp peak is observed in the vicinity of $2\theta = 30.11°$ based on the raw data indicated by a solid line. However, when the peak separation is performed, a peak is also observed at $2\theta = 30.20°$ corresponding to the peak B indicated by the an alternate long and short dash line in addition to the peak C indicated by the dotted line. In addition, the peak corresponding to the peak A indicated by the broken line in FIG. 1 disappeared, or the peak intensity ratio decreased to the extent that the peak could not be detected.

As in Examples 1 and 2 shown in FIGS. 1 and 2, respectively, in the solid electrolyte according to the present embodiment, a phenomenon occurs in which the peak intensity ratio of the peak C existing between the peak A and the peak B increases by performing the heat treatment. In addition, in the case where the peak C does not exist before the heat treatment, a phenomenon in which the peak C newly appears due to the heat treatment may occur.

Furthermore, at the same time as the above phenomenon or instead of the above phenomenon, a phenomenon such as a decrease in the peak intensity ratio of the peak A or an increase in the peak intensity ratio of the peak B may occur by performing the heat treatment.

That is, from the viewpoint of improving the lithium ion conductivity, it is preferable that at least one phenomenon of the decrease in the peak intensity ratio of the peak A, the increase in the peak intensity ratio of the peak B, and the appearance of the peak C or the increase in the peak intensity ratio of the peak C be observed by the heat treatment. In addition, it is more preferable that a phenomenon in which the peak intensity ratio of at least one of the peak B and the peak C increases be observed, and it is still more preferable that a phenomenon in which the peak intensity ratio of the peak A decreases and the peak intensity ratio of at least one of the peak B and the peak C increases be observed. It is also preferable to observe a phenomenon in which the peak intensity ratio of the peak C decreases and the peak intensity ratio of the peak B increases.

On the other hand, in the case of the mixture of powders having argyrodite crystal structures with different compositions, the changes as described above are not observed in the XRD pattern, and the difference in diffraction angles and the relative peak intensity ratio are maintained even in the case where the heat treatment is performed.

A more specific description will be given with reference to FIGS. 1 and 2. It is assumed that the composition of the argyrodite crystal structure indicated by the peak corresponding to the peak A at $2\theta = 29.99°$ before the heat treatment is $\text{Li}_{a1}\text{PS}_{b1}\text{Ha}_{c1}$, the composition of the argyrodite crystal structure indicated by the peak corresponding to the peak B at $2\theta = 30.24°$ before the heat treatment is $\text{Li}_{a2}\text{PS}_{b2}\text{Ha}_{c2}$, and the composition of the argyrodite crystal structure indicated by the peak corresponding to the peak C at $2\theta = 30.11°$ before the heat treatment is $\text{Li}_{a3}\text{PS}_{b3}\text{Ha}_{c3}$.

From the relationship between the peak intensity ratios described above, the content ratios of the compositions in the solid electrolyte before the heat treatment as Example 1 have a relationship of $\text{Li}_{a2}\text{PS}_{b2}\text{Ha}_{c2} > \text{Li}_{a1}\text{PS}_{b1}\text{Ha}_{c1} > \text{Li}_{a3}\text{PS}_{b3}\text{Ha}_{c3}$. In contrast, in Example 2 after the heat treatment, the above content ratios have a relationship of $\text{Li}_{a3}\text{PS}_{b3}\text{Ha}_{c3} > \text{Li}_{a2}\text{PS}_{b2}\text{Ha}_{c2} >> \text{Li}_{a1}\text{PS}_{b1}\text{Ha}_{c1}$.

That is, in Example 2, by performing the heat treatment, the existence ratios of the three argyrodite crystal structures in Example 1 before the heat treatment were changed, and the solid electrolyte was obtained in which the amount of the argyrodite crystal structure represented by $\text{Li}_{a3}\text{PS}_{b3}\text{Ha}_{c3}$, which is a composition between $\text{Li}_{a1}\text{PS}_{b1}\text{Ha}_{c1}$ and $\text{Li}_{a2}\text{PS}_{b2}\text{H}_{c2}$, was increased.

In this way, the appearance of the peak C by the heat treatment or the increase in the peak intensity ratio means that at least one of the composition of the peak A and the composition of the peak B has changed to the composition of the peak C. Among them, the composition of the peak A is preferably changed to the composition of the peak C from the viewpoint of improving the lithium ion conductivity. From the viewpoint of improving the lithium ion conductivity, it is also preferable that at least one of the composition of the peak A and the composition of the peak C be changed by the heat treatment to obtain the composition of the peak B.

The peak A and the peak B of which the difference between diffraction angles ($2\theta$) is 0.05° or more means that two argyrodite crystal structures having different compositions are contained. When focusing on the peak position of $2\theta = 30.3° \pm 0.5°$ where the peak A and the peak B are observed, regarding an argyrodite crystal, particularly a cubic argyrodite crystal, the lattice constants of the two crystals having a difference between diffraction angles ($2\theta$) of 0.05° or more are preferably different from each other by 0.02 Å or more from the viewpoint of improving the lithium ion conductivity, and the difference between the lattice constants is more preferably 0.03 Å or more, and still more preferably 0.05 Å or more. From the viewpoint of crystal stability, the difference between the lattice constants is preferably 0.2 Å or less, more preferably 0.15 Å or less, and still more preferably 0.1 Å or less.

In the argyrodite crystal represented by the peak B on the high angle side, c indicating the element ratio of Ha in the composition $Li_aPS_bHa_c$ (where $5 \leq a \leq 7$, $4 \leq b \leq 6$, and $0 < c \leq 2$) is preferably 0.3 or more, more preferably 1 or more, and still more preferably 1.5 or more from the viewpoint of a high lithium ion conductivity. From the viewpoint of preventing corrosion of the metal collector, c is 2 or less, preferably 1.85 or less, and more preferably 1.7 or less.

In the argyrodite crystal represented by the peak A on the low angle side, c indicating the element ratio of Ha in the composition $Li_aPS_bHa_c$ (where $5 \leq a \leq 7$, $4 \leq b \leq 6$, and $0 < c \leq 2$) is more than 0, preferably 0.5 or more, and more preferably 1 or more from the viewpoint of a high lithium ion conductivity. From the viewpoint of preventing corrosion of the metal collector, c is preferably 1.7 or less, more preferably 1.6 or less, and still more preferably 1.5 or less.

A ratio of the argyrodite crystal $Li_{a1}PS_{b1}Ha_{c1}$ represented by the peak A to the argyrodite crystal $Li_{a2}PS_{b2}Ha_{c2}$ represented by the peak B ($Li_{a1}PS_{b1}Ha_{c1}:Li_{a2}PS_{b2}Ha_{c2}$) is preferably 1:99 to 95:5, more preferably 1:99 to 50:50, and still more preferably 2:98 to 10:90, from the viewpoint of a high lithium ion conductivity.

The difference between diffraction angles ($2\theta$) of the peak A and the peak B may be 0.05° or more, and is preferably 0.06° or more, and more preferably 0.07° or more from the viewpoint of improving the lithium ion conductivity. From the viewpoint of crystal stability, the difference between the diffraction angles ($2\theta$) is preferably 0.8° or less, more preferably 0.6° or less, and still more preferably 0.4° or less. In the analysis of the peaks, the result that the difference between diffraction angles ($2\theta$) of the peak A and the peak B is less than 0.05° may be obtained, and in this case, these peaks are collectively regarded as one peak.

The solid electrolyte according to the present embodiment preferably further has the peak C between the peak A and the peak B, from the viewpoint of improving the lithium ion conductivity. In the argyrodite crystal represented by the peak C, c indicating the element ratio of Ha in the composition $Li_aPS_bHa_c$ (where $5 \leq a \leq 7$, $4 \leq b \leq 6$, and $0 < c \leq 2$) is preferably 0.5 or more, more preferably 1 or more, and still more preferably 1.5 or more from the viewpoint of a high lithium ion conductivity. From the viewpoint of preventing corrosion of the metal collector, c is preferably 1.9 or less, more preferably 1.8 or less, and still more preferably 1.7 or less.

From the viewpoint of improving the lithium ion conductivity, the ratio of $Li_{a2}PS_{b2}Ha_{c2}$ and $Li_{a3}PS_{b3}Ha_{c3}$ is preferably large, and a ratio represented by $Li_{a1}PS_{b1}Ha_{c1}$: ($Li_{a2}PS_{b2}Ha_{c2}+Li_{a3}PS_{b3}Ha_{c3}$) is preferably 1:99 to 95:5, more preferably 1:99 to 50:50, and still more preferably 2:98 to 10:90.

The XRD spectrum of the solid electrolyte according to the present embodiment may also have a peak at a position other than $2\theta=30.3°\pm0.5°$. Similarly to the peaks within the range of $2\theta=30.3°\pm0.5°$, the peaks observed at other positions may be separable into two or more peaks by peak separation.

A preferable crystal structure of the argyrodite crystal is, for example, a cubic crystal such as F-43m, and a rhombohedral crystal, a tetragonal crystal, an orthorhombic crystal, or the like with reduced symmetry or a monoclinic crystal with further reduced symmetry may exist.

In the case where the argyrodite crystal structure is a cubic crystal and the lattice constants satisfy a=b=c, it is considered that the structural change due to the heat treatment occurs isotropically. Therefore, even in the case of other peaks observed within a range other than $2\theta=30.3°\pm0.5°$, by performing the heat treatment at a temperature of 400° C. or higher and a thermal decomposition temperature or lower for 1 hour, it is considered that a phenomenon such as an increase or decrease in the intensity ratio of the peak representing each crystal structure or appearance of a new peak is observed.

In the case where the argyrodite crystal structure is not a cubic crystal, some structural changes may also occur depending on the crystal structure by the heat treatment.

In addition, a solid electrolyte after the following heat treatment also falls in an embodiment of the present invention.

The embodiment relates to a sulfide solid electrolyte having an argyrodite crystal structure represented by $Li_aPS_b$-$Ha_c$ (where $5 \leq a \leq 7$, $4 \leq b \leq 6$, and $0 < c \leq 2$) and to be used for a lithium-ion secondary battery. The solid electrolyte has a peak D and a peak E within a range of $2\theta=30.3°\pm0.5°$ in an X-ray diffraction spectrum using a Cu-Kα ray. The full width at half maximum of these peaks is 0.07° or more, and the difference between the diffraction angles ($2\theta$) of the two peaks is 0.02° to 0.4°. In addition, even in the case where the heat treatment is performed at a temperature of 400° C. or higher and a thermal decomposition temperature or lower for 1 hour, no change is observed in the X-ray diffraction spectrum.

The peak D and the peak E of which a difference between diffraction angles ($2\theta$) is 0.02° to 0.4° correspond to the peak A or the peak B and the peak C before the heat treatment, respectively, and are two different kinds of argyrodite crystals.

In the case where the peak D is on the low angle side and the peak E is on the high angle side, the peak D and the peak E correspond to the peak A and the peak C before the heat treatment, respectively, or the peak C and the peak B before the treatment, respectively.

In the case where the peak D and the peak E correspond to the peak A and the peak C, respectively, a peak F on the high angle side corresponding to the peak B may be further included. In the case where the peak D and the peak E correspond to the peak C and the peak B, respectively, a peak G on the low angle side corresponding to the peak A may be further included. At this time, the full width at half maximum of the peak F and the peak G is preferably 0.07° or more. The difference between diffraction angles ($2\theta$) of the peak F and the peak E is preferably 0.05° to 0.4°, and the difference between diffraction angles ($2\theta$) of the peak G and the peak D is preferably 0.05° to 0.4°.

The difference between diffraction angles ($2\theta$) of the peak D and the peak E may be 0.02° to 0.4°, and is preferably 0.05° or more, more preferably 0.07° or more, and still more preferably 0.09° or more from the viewpoint of improving the lithium ion conductivity. From the viewpoint of crystal stability, the difference between diffraction angles ($2\theta$) is preferably 0.3° or less, and more preferably 0.2° or less. The preferred ranges of the difference between diffraction angles ($2\theta$) of the peak F and the peak E and the difference between diffraction angles ($2\theta$) of the peak G and the peak D are also the same as those described above.

In the solid electrolyte according to the present embodiment including the respective argyrodite crystal structures represented by the peak D and the peak E, the ratio of crystals, the difference between diffraction angles, and the like can be adjusted by the conditions of the heat treatment.

It should be noted that whether the solid electrolyte has been subjected to the heat treatment can be determined not only by the fact that there is no change in the XRD spectrum in the case where the additional heat treatment is performed, but also by the degree of change in the lithium ion conductivity. The change in the XRD spectrum means that the values of the diffraction angles ($2\theta$) of the peak D and the peak E do not change, or even if the values change, the difference between the diffraction angles before and after the heat treatment is 0.05° or less. The change in the peak intensity ratio before and after the heat treatment is also preferably 0.1 or less. The degree of change in the lithium ion conductivity before and after the heat treatment is preferably 0.5 mS/cm or less.

The additional heat treatment is performed in a temperature range of 400° C. or higher and a thermal decomposition temperature or lower for 1 hour.

In $Li_aPS_bHa_c$ (where $5 \leq a \leq 7$, $4 \leq b \leq 6$, and $0 < c \leq 2$) representing the composition of the argyrodite crystal, the halogen element represented by Ha is at least one selected from the group consisting of F, Cl, Br, and I. In view that the crystal is likely to be an argyrodite, at least one of Cl and Br is preferably contained, Cl is more preferably contained, and Cl simple substance or a mixture of Cl and Br is still more preferably contained.

The crystallite size of the argyrodite crystal is preferably small from the viewpoint of obtaining a good lithium ion conductivity when the solid electrolyte is finely pulverized to produce a lithium ion battery, and specifically, the crystallite size is preferably 1,000 nm or less, more preferably 500 nm or less, and still more preferably 250 nm or less. The lower limit of the crystallite size is not particularly limited, and is generally 5 nm or more.

A crystallite size after the heat treatment is larger than that before the heat treatment, and the crystallite size is preferably within the above range even after the heat treatment.

The crystallite size can be calculated from the full width at half maximum of the peaks of the XRD pattern.

The secondary particle size of the argyrodite crystal is preferably small from the viewpoint of obtaining a good lithium ion conductivity when the solid electrolyte is finely pulverized to produce a lithium ion battery, and specifically, the secondary particle size is preferably 10 μm or less, more preferably 3 μm or less, and still more preferably 1 μm or less. The lower limit of the secondary particle size is not particularly limited, and is generally 0.1 μm or more.

The secondary particle size can be measured using a microtrack apparatus.

The full width at half maximum of each peak is 0.07° or more, preferably 0.075° or more, more preferably 0.08° or more, and still more preferably 0.09° or more, in view that the crystallite size is preferably small. In addition, the upper limit of the full width at half maximum is not particularly limited, and is generally determined within 0.5°. In the case where the full width at half maximum is larger than this, it is better to further increase the number of peaks and perform analysis again. An analysis method for determining the full width at half maximum will be described later.

The argyrodite crystal structure in the present embodiment may contain oxide anions. For example, from the viewpoints of improving the heat resistance of the crystal and allowing the crystal to stably exist without being decomposed even by a heat treatment at a high temperature, the argyrodite crystal structure preferably contains oxide anions each having a Q0 structure in which a metal atom (M) and an oxygen atom (O) are bonded.

Here, the Q0 structure means a structure in which all oxygen atoms bonded to M that is a central cation are non-crosslinked oxygen atoms. For example, in the case where M represents Si, it means that an oxide of $SiO_2$ exists as silicate ions, that is, oxide anions referred to as $SiO_4^{4-}$.

The elements constituting the oxide anions may include M and O, and M is at least one element selected from the group consisting of metal elements and metalloid elements of Groups 2 to 14 of the periodic table. The oxide anions may be used alone or in combination of a plurality kinds thereof.

Metal elements of Groups 2 to 14 refer to elements of Groups 2 to 12, elements of Group 13 other than B, and elements of Group 14 other than C, Si, and Ge, of the periodic table.

The metalloid elements of Groups 2 to 14 are B, Si, and Ge among the elements of Groups 13 and 14 of the periodic table.

The existence of the M-O bond in the oxide anions and the Q0 structure can be confirmed by Raman spectroscopy measurement or nuclear magnetic resonance (NMR) measurement. It can be confirmed by X-ray powder diffraction (XRD) measurement or neutral-beam scattering measurement that the oxide anions having the Q0 structure exist in the crystal structure, that is, at the anion site of the crystal.

A total content of the elements constituting the two or more argyrodite crystal structures relative to all the components constituting the solid electrolyte according to the present embodiment is preferably 80 mass % or more, more preferably 85 mass % or more, still more preferably 90 mass % or more, yet still more preferably 92 mass % or more, and particularly preferably 94 mass % or more, from the viewpoint of achieving a high lithium ion conductivity. The upper limit of the total content is not particularly limited, and may be 100 mass %. The solid electrolyte according to the present embodiment may also include crystals other than the argyrodite crystal, and amorphous crystals.

The total content refers to, for example, the total of Li, P, S, and Ha, and the total content of the elements Li, P, S, Ha, M, and O in the case where the oxide anions are contained in the crystal. In the present specification, the content of Ha refers to the total content of F, Cl, Br, and I.

The content of each element and the total thereof are determined by composition analysis using ICP emission spectrometry, atomic absorption, ion chromatography, or the like.

In addition to the above, $Li_3PS_4$, $Li_4P_2S_6$, $Li_2S$, and LiHa (where Ha is at least one halogen element selected from F, Cl, Br, and I) may be contained in the solid electrolyte.

As an index of heat resistance, the thermal decomposition test temperature of the solid electrolyte is preferably 400° C. or higher, more preferably 450° C. or higher, still more preferably 500° C. or higher, yet still more preferably 600° C. or higher, and particularly preferably 650° C. or higher. The upper limit is not particularly limited, and is generally 900° C. or lower. However, in the case of an argyrodite crystal in which the proportion of the halogen element is high, the thermal decomposition temperature tends to decrease. Therefore, the composition of the argyrodite crystal contained in the solid electrolyte according to the present embodiment is selected in consideration of the balance with the characteristics desired for the solid electrolyte.

In the thermal decomposition test of the solid electrolyte, the heat resistance can be evaluated by charging the solid electrolyte in a sealed container that does not react with the solid electrolyte, performing a heat treatment at a predetermined temperature for 10 minutes to 60 minutes, and investigating a change in the lithium ion conductivity before and after the heat treatment. The smaller the change in the lithium ion conductivity before and after the heat treatment is, the more preferable it is. In the case where the lithium ion conductivity after the heat treatment is less than half the lithium ion conductivity before the heat treatment, the thermal decomposition resistance, that is, the heat resistance is low.

In the present specification, the lithium ion conductivity means a lithium ion conductivity at 25° C., and is determined from a Nyquist plot obtained by AC impedance measurement.

<Method for Manufacturing Sulfide Solid Electrolyte>

A method for manufacturing the sulfide solid electrolyte according to the present embodiment is not particularly limited, as long as two or more different argyrodite crystal structures represented by $Li_aPS_bHa_c$ (where $5 \leq a \leq 7$, $4 \leq b \leq 6$, and $0 < c \leq 2$) which coexist on the order of several hundreds of nm or several tens of nm can be obtained.

As one embodiment, a manufacturing method including a step of mixing raw materials containing Li, P, S, and Ha and heating and melting the mixture, and subsequently a step of performing crystallization by rapid cooling is preferable. By rapid cooling under a normal pressure, a solid electrolyte in which two or more argyrodite crystals coexist on the order of several hundreds of nm or several tens of nm is obtained.

Examples of the raw material containing Li, P, S, and Ha include known materials as a material for obtaining an argyrodite crystal containing Li, P, S, and Ha.

Specifically, Li simple substance or a compound containing Li, P simple substance or a compound containing P, S simple substance or a compound containing S, and a compound containing Ha can be appropriately combined and used. These compounds may be a compound containing two or more of Li, P, S, and Ha. For example, phosphorus pentasulfide ($P_2S_5$) may be used as a compound serving as both the compound containing S and the compound containing P. In addition, lithium halide may be used as a compound serving as both the compound containing Li and the compound containing Ha.

Examples of the compound containing Li include lithium compounds such as lithium sulfide ($Li_2S$), lithium carbonate ($Li_2CO_3$), lithium sulfate ($Li_2SO_4$), lithium oxide ($Li_2O$), and lithium hydroxide (LiOH). From the viewpoint of ease of handling, lithium sulfide is preferably used.

On the other hand, since lithium sulfide is expensive, it is preferable to use a lithium compound other than lithium sulfide, metallic lithium, or the like from the viewpoint of reducing the production cost. Specifically, it is preferable to use one or more selected from the group consisting of metallic lithium, lithium carbonate ($Li_2CO_3$), lithium sulfate ($Li_2SO_4$), lithium oxide ($Li_2O$), and lithium hydroxide (LiOH). These may be used alone or in combination of two or more kinds thereof.

Examples of the compound containing S include phosphorus sulfides such as phosphorus trisulfide ($P_2S_3$) and phosphorus pentasulfide ($P_2S_5$), other sulfur compounds containing phosphorus, elemental sulfur, and a compound containing sulfur. Examples of the compound containing sulfur include $H_2S$, $CS_2$, iron sulfides (FeS, $Fe_2S_3$, $FeS_2$, $Fe_{1-x}S$, etc.), bismuth sulfide ($Bi_2S_3$), and copper sulfides (CuS, $Cu_2S$, $Cu_{1-x}S$, etc.). Among them, phosphorus sulfides are preferable, and phosphorus pentasulfide ($P_2S_5$) is more preferable, from the viewpoint of preventing the inclusion of elements other than the elements constituting the target sulfide solid electrolyte. These may be used alone or in combination of two or more kinds thereof. Phosphorus sulfides are a compound serving as both the compound containing S and the compound containing P.

Examples of the compound containing P include phosphorus sulfides such as phosphorus trisulfide ($P_2S_3$) and phosphorus pentasulfide ($P_2S_5$), and phosphorus compounds such as sodium phosphate ($Na_3PO_4$). Among them, phosphorus sulfides are preferable, and phosphorus pentasulfide ($P_2S_5$) is more preferable, from the viewpoint of preventing the inclusion of elements other than the elements constituting the target sulfide solid electrolyte. These may be used alone or in combination of two or more kinds thereof.

Examples of the compound containing Ha include lithium halides such as lithium fluoride (LiF), lithium chloride (LiCl), lithium bromide (LiBr), and lithium iodide (LiI), phosphorus halides, phosphoryl halides, sulfur halides, sodium halides, and boron halides. Among them, lithium halides are preferable, and LiCl, LiBr, and LiI are more preferable, from the viewpoint of preventing the inclusion of elements other than the elements constituting the target sulfide solid electrolyte. These compounds may be used alone or in combination of two or more kinds thereof.

The raw materials can be mixed by, for example, mixing in a mortar, mixing using a medium such as a planetary ball mill, and medium-less mixing such as a pin mill, a powder stirrer, and air flow mixing. The raw materials may be made amorphous by mixing before heating.

A specific method of heating and melting the mixture of the raw materials is not particularly limited, and examples thereof include a method in which a raw material is charged into a heat-resistant container and heated by a heating furnace. The heat-resistant container is not particularly limited, and examples thereof include a heat-resistant container made of carbon, a heat-resistant container containing an oxide such as quartz, a quartz glass, borosilicate glass, an aluminosilicate glass, alumina, zirconia, and mullite, a heat-resistant container containing a nitride such as silicon nitride and boron nitride, and a heat-resistant container containing a carbide such as silicon carbide. These heat-resistant containers may be a container in which a bulk is formed of the above-described material, or a layer of carbon, an oxide, a nitride, a carbide, or the like is formed.

The heating temperature when the mixture of the raw materials is heated and melted is preferably 600° C. or higher, more preferably 630° C. or higher, and still more preferably 650° C. or higher from the viewpoint of increasing the fluidity of the molten solution. In addition, the heating temperature is preferably 900° C. or lower, more preferably 850° C. or lower, and still more preferably 800° C. or lower from the viewpoint of preventing deterioration or decomposition due to heating of the components in the molten solution.

The heating and melting time is preferably 0.1 hours or more, more preferably 0.5 hours or more, still more preferably 0.7 hours or more, and yet still more preferably 1 hour or more from the viewpoint of allowing the reaction to proceed. In addition, from the viewpoint of preventing deterioration or decomposition due to heating of the components in the molten solution, the heating and melting time is preferably 10 hours or less, more preferably 9.5 hours or less, and still more preferably 9 hours or less.

The pressure during heating and melting is not particularly limited, and specifically, a normal pressure to a slight pressure is preferable, and the normal pressure is more preferable.

From the viewpoint of preventing side reactions with water vapor, oxygen, and the like during heating and melting, the dew point is preferably −20° C. or lower. The lower limit is not particularly limited, and is generally about −80° C. The oxygen concentration during heating and melting is preferably 1,000 ppm or less.

The mixture of the raw materials which is heated and melted is rapidly cooled under a normal pressure to perform crystallization. Accordingly, a solid electrolyte in which two or more argyrodite crystals on the order of several hundreds of nm or several tens of nm coexist is obtained.

The rapid cooling may be performed at a cooling rate of 1° C./sec or more, preferably 10° C./sec or more, and more preferably 100° C./sec or more. The upper limit of the cooling rate is not particularly limited, and is 1,000,000° C./sec or less in consideration of the cooling rate of a twin roller, which is generally said to have the highest rapid cooling rate.

The normal pressure during the rapid cooling means that the pressure is not controlled during cooling. Specifically, the pressure is about 0.8 atm to 1.2 atm.

After the rapid cooling under the normal pressure, a heat treatment may be further performed to perform a stabilization treatment. The crystallinity is further enhanced by the heat treatment. Depending on the conditions of the heat treatment, a new argyrodite crystal having a composition between a plurality of argyrodite crystals before the heat treatment may be also obtained.

The time of the heat treatment which is the stabilization treatment is preferably 0.1 hours or more, and more preferably 0.2 hours or more, from the viewpoint of more reliably performing crystal precipitation. From the viewpoint of obtaining a new argyrodite crystal, the heat treatment time is preferably 0.5 hours or more, and more preferably 1 hour or more.

On the other hand, from the viewpoint of preventing thermal deterioration due to heating, the heat treatment time is preferably 10 hours or less, and more preferably 5 hours or less. From the viewpoint of preventing the lithium ion conductivity from being excessively lowered due to excessive progress of crystallization, the heat treatment time is preferably 3 hours or less, and more preferably 2 hours or less.

The temperature of the heat treatment which is the stabilization treatment is preferably equal to or higher than the glass transition temperature of the solid electrolyte, specifically preferably 200° C. or higher, and more preferably 250° C. or higher. From the viewpoint of obtaining a new argyrodite crystal, the heat treatment temperature is preferably 350° C. or higher, and more preferably 400° C. or higher.

On the other hand, from the viewpoint of preventing thermal deterioration and thermal decomposition, the heat treatment temperature is preferably equal to or lower than a thermal decomposition temperature, for example, preferably 600° C. or lower, and more preferably 575° C. or lower. From the viewpoint of preventing the lithium ion conductivity from being excessively lowered due to excessive progress of crystallization, the heat treatment temperature is preferably 550° C. or lower, and more preferably 530° C. or lower.

In the case where the solid electrolyte according to the present embodiment contains oxide anions having a Q0 structure having an M-O bond, the timing of adding an oxide having a M-O bond is not particularly limited. For example, an oxide may be mixed together with the raw material and heated and melted. In addition, an oxide may be mixed with a crystal obtained by rapid cooling under a normal pressure, and subjected to the heat treatment.

In the case where the obtained solid electrolyte is used for a lithium-ion secondary battery, the solid electrolyte may contain other components such as a binder as necessary to form a solid electrolyte layer. As the binder or other components, known substances according to the related art are used.

The content of the solid electrolyte according to the present embodiment relative to the entire solid electrolyte layer is preferably 80 mass % or more, and more preferably 90 mass % or more. The upper limit of the content of the solid electrolyte is not particularly limited, and may be 100 mass %. From the viewpoint of preventing deformation, an inorganic filler and an organic filler may be mixed, and in this case, the content of the solid electrolyte is preferably 99 mass % or less.

As a method for forming the solid electrolyte layer, a known method according to the related art is also used. For example, the solid electrolyte layer can be formed by dispersing or dissolving the components constituting the solid electrolyte layer in a solvent to form a slurry, applying the slurry in the form of a layer (sheet), drying the slurry, and freely pressing the slurry. If necessary, the binder may be removed by heating. The thickness of the solid electrolyte layer can be easily adjusted by adjusting the coating amount of the slurry.

In addition, instead of wet molding, the solid electrolyte layer may be formed by press-molding the solid electrolyte powder or the like according to the present embodiment on a surface of a positive electrode, a negative electrode, or the like by a dry method. Alternatively, the solid electrolyte layer may be formed on another base material and transferred onto a surface of a positive electrode, a negative electrode, or the like.

The solid electrolyte according to the present embodiment may be used as a positive electrode layer or a negative electrode layer by being mixed with a positive electrode active material or a negative electrode active material. As the positive electrode active material or negative electrode active material used for the positive electrode layer or negative electrode layer, a current collector, a binder, a conductive aid, and the like, known materials according to the related art are used.

A lithium-ion secondary battery containing the solid electrolyte according to the present embodiment includes the solid electrolyte layer, the positive electrode layer, and the negative electrode layer.

As the material of an outer casing of the lithium-ion secondary battery, known materials according to the related art may also be used. As the shape of the lithium-ion secondary battery, known shapes according to the related art can be used, and examples of the shape of the lithium-ion secondary battery include a coin shape, a sheet shape (film shape), a folded shape, a wound cylindrical shape with a bottom, and a button shape. The shape thereof can be appropriately selected according to the application.

EXAMPLES

Hereinafter, the present invention will be specifically described with reference to Examples, but the present invention is not limited thereto.

Example 1, Example 2, and Examples 4 to 9 are inventive examples, and Example 3 is a comparative example.

[Evaluation]

(Lithium Ion Conductivity)

The obtained sulfide solid electrolyte powder was formed into a powder body under a pressure of 380 kN, the powder body was used as a measurement sample, and the lithium ion conductivity thereof was measured using an AC impedance measuring device (potentiostat/galvanostat VSP, manufactured by Bio-Logic Sciences Instruments).

The measurement conditions were as follows: a measurement frequency of 100 Hz to 1 MHz, a measurement voltage of 100 mV, and a measurement temperature of 25° C.

(Powder X-Ray Diffraction)

The XRD spectrum of the sulfide solid electrolyte was measured using an X-ray diffractometer (Smart Lab, manufactured by Rigaku Corporation). The sulfide solid electrolyte serving as the measurement sample deteriorated when exposed to the air, so that the sample was prepared in an atmosphere not exposed to the air and used for the measurement.

Sample Preparation: The sulfide solid electrolyte powder pulverized in a mortar was passed through a sieve having an opening of 100 μm to prepare a sulfide solid electrolyte powder having a particle size distribution with a 50% particle size $D_{50}$ of 5 μm to 10 μm. The particle size distribution was measured using a laser diffraction particle size distribution analyzer MT 3300 EXII manufactured by Microtrac, and the 50% particle size $D_{50}$ was measured based on a chart of the obtained volume-based particle size distribution.

The measurement conditions of the powder X-ray diffraction are as follows.

Radiation Source: CuKα ray ($λ$=1.5418 Å), tube bulb voltage: 45 kV, tube bulb current: 200 mA, scanning angle: 10° to 100°, scanning speed: 5°/min, number of steps: 0.01°/step.

An analysis method of performing peak separation based on raw data of the obtained XRD spectrum, and a method of determining the full width at half maximum are as follows.

Using integrated powder X-ray analysis software PDXL2 attached to an X-ray diffractometer (Smart Lab, manufactured by Rigaku Corporation), removal of the baseline and removal of the Cu-Kα2 ray were performed.

Next, attention was paid to a peak appearing at $2θ$=30.3°±0.5°, and a pseudo Voigt function for peak fitting was defined as in the expression (1).

$$f(2θ) = A[a * L(2θ) + (1 - a) * G(2θ)] + B \quad \text{expression (1)}$$

$$L(2θ) = \frac{ω^2}{4(x - x_0)^2 + ω^2} \quad \text{expression (2)}$$

$$G(2θ) = \exp\left[-\left(\frac{x - x_0}{ω}\right)^2 (4\ln(2))\right] \quad \text{expression (3)}$$

In the expression (1), A represents a peak coefficient, B represents a height correction coefficient, a represents a full width at half maximum, and a represents a mixing ratio. The expression (2) represents a Lorentzian function, and the expression (3) represents a Gaussian function. The symbol $x_0$ represents a peak center value and is represented by a value of $2θ$. In general, when the XRD spectrum is represented by values of $2θ$ on the horizontal axis, the XRD spectrum becomes a left-right asymmetric spectrum. Therefore, the XRD spectrum is represented by changing the mixing ratio in the expression (1) before and after the peak value ($=x_0$) and is analyzed.

The cause of the non-symmetry is mainly the apparatus and the penetration depth of the X-ray into the sample. In this analysis, the mixing ratio determined based on the analysis of Example 3 produced by the solid phase method according to the related art was adopted. Specifically, 1.00 was adopted in the case where $x_0 \geq x$, and 0.36 was adopted in the case where $x_0 < x$. Using the mixing ratio, a peak of a silicon single crystal was analyzed and the result was well matched.

An index called Rwp was used for evaluation of consistency in analysis of the fitting function. This is an index used for Rietveld analysis of the XRD spectrum.

It is preferable that a value of Rwp determined when one or a plurality of fitting functions defined above are applied to the peaks appearing within the range of $2θ$=30.3°±0.5° is low. Specifically, the value of Rwp is preferably 15% or less, more preferably 12.5% or less, and still more preferably 10% or less. It should be noted that the value of Rwp is a positive value.

Example 1

Under a dry nitrogen atmosphere, a lithium sulfide powder (manufactured by Sigma, purity: 99.98%), a phosphorus pentasulfide powder (manufactured by Sigma, purity: 99%), and a lithium chloride powder (manufactured by Sigma, purity: 99.99%) were weighed so as to have a composition ratio of $Li_6PS_5Cl$, and mixed in a mortar. The obtained mixture was charged into a heat-resistant container and melted by heating at 730° C. for 0.5 hours in an atmosphere having a dew point of −60° C. Thereafter, the mixture was cooled to room temperature at a cooling rate of 10° C./sec to obtain a solid as a sulfide solid electrolyte.

Among the XRD spectra of the obtained solid electrolyte, a spectrum around $2θ$=30.3° was shown in FIG. 1. When peak separation was performed on the unprocessed spectrum indicated by the solid line, three peaks were observed within the range of $2θ$=30.3°±0.5°. The details of the peak are shown in Table 1.

As a result of Rietveld analysis of the XRD spectrum, it was found that a diffraction peak at $2θ$=29.99° corresponding to the peak A of the obtained solid electrolyte was a peak derived from an argyrodite crystal having a composition of $Li_{6.9}PS_{5.9}Cl_{0.1}$, a diffraction peak at $2θ$=30.11° corresponding to the peak C was a peak derived from an argyrodite crystal having a composition of $Li_{5.9}PS_{4.9}Cl_{1.1}$, and a diffraction peak at $2θ$=30.24° corresponding to the peak B was a peak derived from an argyrodite crystal having a composition of $Li_{5.5}PS_{4.5}Cl_{1.5}$. The molar ratios of the three kinds of argyrodite crystals were about $Li_{6.9}PS_{5.9}Cl_{0.1}$:$Li_{5.9}PS_{4.9}Cl_{1.1}$:$Li_{5.5}PS_{4.5}Cl_{1.5}$=2:1:3, and the lattice constants of the three kinds of argyrodite crystals were 9.904 Å, 9.851 Å, and 9.804 Å in this order.

The "basic composition" in Table 1 refers to a composition targeted when raw materials are mixed. In Example 1, the basic composition is $Li_6PS_5Cl$, but the composition of the actually obtained argyrodite crystal is different from the basic composition, as determined from the peak A, the peak B, and the peak C described above, in which $Li_{6.9}PS_{5.9}Cl_{0.1}$, $Li_{5.5}PS_{4.5}Cl_{1.5}$, and $Li_{5.9}PS_{4.9}Cl_{1.1}$ coexist.

In Table 1, "-" in the peak A or B means that the peak disappeared or the peak intensity ratio was so small that the peak could not be detected. In addition, the peak intensity ratio is an intensity ratio relatively expressed with the sum of the peak intensities of the peak A, the peak B, and the peak C as 1.

Example 2

The solid obtained in Example 1 was further subjected to a heat treatment at 500° C. for 1 hour under a nitrogen atmosphere to obtain a sulfide solid electrolyte. Among the XRD spectra of the obtained solid electrolyte, a spectrum around $2θ$=30.3° was shown in FIG. 2. When peak separation was performed on the unprocessed spectrum indicated by the solid line, two peaks were observed within the range of $2\theta=30.3°\pm0.5°$. The details of the peaks are shown in Table 1.

As a result of Rietveld analysis of the XRD spectrum, it was found that the obtained solid electrolyte had two kinds of argyrodite crystals in which $Li_{5.9}PS_{4.9}Cl_{1.1}$: $Li_{5.5}PS_{4.5}Cl_{1.5}=5:1$ (molar ratio).

Example 3

The same mixture as in Example 1 was mixed at 400 rpm for 4 hours using a planetary ball mill. The obtained mixture was vacuum-sealed in a carbon-coated quartz tube and heated at 550° C. for 5 hours to obtain a solid as a sulfide solid electrolyte. Among the XRD spectra of the obtained solid electrolyte, one peak was observed within the range of $2\theta=30.3°\pm0.5°$. The details of the peaks are shown in Table 1.

As a result of Rietveld analysis of the XRD spectrum, it was found that the obtained solid electrolyte had one kind of argyrodite crystal that is $Li_6PS_5Cl$.

Example 4

A solid as a sulfide solid electrolyte was obtained in the same manner as in Example 1 except that a mixture was prepared by weighing a lithium sulfide powder (manufactured by Sigma, purity: 99.98%), a phosphorus pentasulfide powder (manufactured by Sigma, purity: 99%), and a lithium chloride powder (manufactured by Sigma, purity: 99.99%) so as to have a composition ratio of $Li_{5.4}PS_{4.4}Cl_{1.6}$. In the XRD spectrum of the obtained solid electrolyte, three peaks were confirmed within the range of $2\theta=30.3°\pm0.5°$, and were at $2\theta=30.15°$, $30.29°$, and $30.33°$, respectively. Among them, regarding the two peaks at $2\theta=30.29°$ and $2\theta=30.33°$ whose differences between diffraction angles is less than 0.05°, it is presumed that the solid electrolyte has two kinds of argyrodite crystals which have almost the same composition and whose compositions are close to the composition of $Li_{5.4}PS_{4.4}Cl_{1.6}$. It is presumed that the composition of the argyrodite crystal having a peak at $2\theta=30.15°$ is close to the composition of $Li_{5.7}PS_{4.7}Cl_{1.7}$.

Example 5

The solid obtained in Example 4 was further subjected to a heat treatment at 450° C. for 1 hour under a nitrogen atmosphere to obtain a sulfide solid electrolyte. In the XRD spectrum of the obtained solid electrolyte, three peaks were observed within the range of $2\theta=30.3°\pm0.5°$. The intensity ratio of the peak on the high angle side corresponding to the peak B was higher than that of the peak in Example 4. From the results of the composition analysis, no composition change was observed before and after the heat treatment. Therefore, it can be said that the obtained solid electrolyte has an argyrodite crystal having a composition of $Li_{5.4}PS_{4.4}Cl_{1.6}$ and a lattice constant lower than that before the heat treatment.

Example 6

A solid as a sulfide solid electrolyte was obtained in the same manner as in Example 1, except that a mixture was prepared by weighing a lithium sulfide powder (manufactured by Sigma, purity 99.98%), a phosphorus pentasulfide powder (manufactured by Sigma, purity 99%), a lithium chloride powder (manufactured by Sigma, purity 99.99%), and a lithium bromide powder (manufactured by Sigma, purity 99.995%) so as to have a composition ratio of $Li_{5.6}PS_{4.4}Cl_{1.5}Br_{0.2}$. In the XRD spectrum of the obtained solid electrolyte, three peaks were confirmed within the range of $2\theta=30.3°\pm0.5°$, and were at $2\theta=30.16°$, $30.34°$, and $30.41°$, respectively. Among them, it is presumed that a peak at $2\theta=30.34°$ corresponding to the peak C is derived from an argyrodite crystal having a composition close to the composition of $Li_{5.6}PS_{4.4}Cl_{1.5}Br_{0.2}$, and it is presumed that the two peaks corresponding to the peak A and the peak B have an argyrodite crystal having a composition or a lattice constant slightly different from that of the peak corresponding to the peak C.

Example 7

The solid obtained in Example 6 was further subjected to a heat treatment at 450° C. for 1 hour under a nitrogen atmosphere to obtain a sulfide solid electrolyte. In the XRD spectrum of the obtained solid electrolyte, two peaks were observed within the range of $2\theta=30.3°\pm0.5°$. The intensity ratio of the peak on the high angle side corresponding to the peak B was higher than that of the peak in Example 6. From the results of the composition analysis, no composition change was observed before and after the heat treatment. Therefore, it can be said that the obtained solid electrolyte has an argyrodite crystal having a composition of $Li_{5.6}PS_{4.4}Cl_{1.5}Br_{0.2}$ and a lattice constant lower than that before the heat treatment.

Example 8

A solid as a sulfide solid electrolyte was obtained in the same manner as in Example 1 except that a mixture was prepared by weighing a lithium sulfide powder (manufactured by Sigma, purity: 99.98%), a phosphorus pentasulfide powder (manufactured by Sigma, purity: 99%), a lithium chloride powder (manufactured by Sigma, purity: 99.99%), and a lithium bromide powder (manufactured by Sigma, purity: 99.995%) so as to have a composition ratio of $Li_{5.6}PS_{4.4}Cl_{0.8}Br_{0.8}$. In the XRD spectrum of the obtained solid electrolyte, three peaks were confirmed within the range of $2\theta=30.3°\pm0.5°$, and were at $2\theta=30.05°$, $30.14°$, and $30.33°$, respectively. Among them, it is presumed that a peak at $2\theta=30.14°$ corresponding to the peak C is derived from an argyrodite crystal having a composition close to that of $Li_{5.6}PS_{4.4}Cl_{0.8}Br_{0.8}$, and it is presumed that the two peaks corresponding to the peak A and peak B have argyrodite crystals having a composition or a lattice constant slightly different from that of the peak corresponding to the peak C.

Example 9

The solid obtained in Example 8 was further subjected to a heat treatment at 450° C. for 1 hour under a nitrogen atmosphere to obtain a sulfide solid electrolyte. In the XRD spectrum of the obtained solid electrolyte, two peaks were observed within the range of $2\theta=30.3°\pm0.5°$. A peak at $2\theta=30.14°$ corresponding to the peak C having a large peak intensity ratio, which can be said to be a main peak, becomes sharp through the heat treatment, and has an increased intensity ratio. Therefore, it is presumed that the solid electrolyte has an argyrodite crystal having a composition of $Li_{5.6}PS_{4.4}Cl_{0.8}Br_{0.8}$ with further increased crystallinity.

TABLE 1

| | Basic composition | Heat treatment |
|---|---|---|
| Example 1 | Li$_6$PS$_5$Cl | — |
| Example 2 | | 500° C., 1 hour |
| Example 3 | | — |
| Example 4 | Li$_{5.4}$PS$_{4.4}$Cl$_{1.6}$ | — |
| Example 5 | | 450° C., 1 hour |
| Example 6 | Li$_{5.6}$PS$_{4.4}$Cl$_{1.5}$Br$_{0.2}$ | — |
| Example 7 | | 450° C., 1 hour |
| Example 8 | Li$_{5.6}$PS$_{4.4}$Cl$_{0.8}$Br$_{0.8}$ | — |
| Example 9 | | 450° C., 1 hour |

| | | Peak at 2θ = 30.3° ± 0.5° | | | | |
|---|---|---|---|---|---|---|
| | | Peak A | Peak C | Peak B | Changes in peak due to heat treatment | Rwp | Lithium ion conductivity (mS/cm) |
| Example 1 | Peak position (2θ degree) | 29.99 | 30.11 | 30.24 | — | 10.4% | 3.1 |
| | Peak intensity ratio | 0.39 | 0.16 | 0.45 | | | |
| | Full width at half maximum (2θ degree) | 0.116 | 0.181 | 0.158 | | | |
| Example 2 | Peak position (2θ degree) | — | 30.11 | 30.20 | Decrease in intensity ratio of peak A Increase in intensity ratio of peak C | 11.0% | 2.7 |
| | Peak intensity ratio | | 0.80 | 0.20 | | | |
| | Full width at half maximum (2θ degree) | | 0.083 | 0.116 | | | |
| Example 3 | Peak position (2θ degree) | | 30.14 | | — | 12.3% | 1.2 |
| | Peak intensity ratio | | 1.00 | | | | |
| | Full width at half maximum (2θ degree) | | 0.066 | | | | |
| Example 4 | Peak position (2θ degree) | 30.15 | 30.29 | 30.33 | — | 11.7% | 7.3 |
| | Peak intensity ratio | 0.07 | 0.46 | 0.47 | | | |
| | Full width at half maximum (2θ degree) | 0.164 | 0.131 | 0.118 | | | |
| Example 5 | Peak position (2θ degree) | 30.20 | 30.31 | 30.38 | Increase in intensity ratio of peak B | 8.1% | 5.5 |
| | Peak intensity ratio | 0.06 | 0.35 | 0.59 | | | |
| | Full width at half maximum (2θ degree) | 0.222 | 0.135 | 0.103 | | | |
| Example 6 | Peak position (2θ degree) | 30.16 | 30.34 | 30.41 | — | 9.6% | 9.4 |
| | Peak intensity ratio | 0.03 | 0.58 | 0.39 | | | |
| | Full width at half maximum (2θ degree) | 0.309 | 0.120 | 0.125 | | | |
| Example 7 | Peak position (2θ degree) | — | 30.32 | 30.44 | Decrease in intensity ratio of peak A Increase in intensity ratio of peak B | 15.0% | 7.3 |
| | Peak intensity ratio | | 0.22 | 0.78 | | | |
| | Full width at half maximum (2θ degree) | | 0.138 | 0.130 | | | |
| Example 8 | Peak position (2θ degree) | 30.05 | 30.14 | 30.30 | — | 10.5% | 10.5 |
| | Peak intensity ratio | 0.37 | 0.60 | 0.03 | | | |
| | Full width at half maximum (2θ degree) | 0.303 | 0.192 | 0.223 | | | |
| Example 9 | Peak position (2θ degree) | 30.5 | 30.14 | — | Decrease in intensity ratio of peak A Increase in intensity ratio of peak C | 12.6% | 9.3 |
| | Peak intensity ratio | 0.23 | 0.77 | | | | |
| | Full width at half maximum (2θ degree) | 0.101 | 0.102 | | | | |

In Example 1, Example 2, and Examples 4 to 9, the same value as that of Example 3 was used as the mixing ratio during the fitting analysis represented by the parameter a of the expression (1). All the analysis results showed good values of Rwp of 15% or less.

From the results described above, the sulfide solid electrolyte in Example 3 obtained by the solid phase method according to the related art contained one kind of argyrodite crystal, and the lithium ion conductivity was 1.2 mS/cm. On the other hand, the solid electrolytes in Example 1 and Example 2 contain two or three kinds of argyrodite crystals although the types and amounts of the raw materials are the same as those of Example 3. The lithium ion conductivities were 3.1 mS/cm and 2.7 mS/cm, respectively, which were much higher than that of Example 3.

When Example 1 and Example 2, Example 4 and Example 5, Example 6 and Example 7, and Example 8 and Example 9 are respectively compared, it was found that the peak of the XRD spectrum becomes sharp by performing the heat treatment, and the lattice constant tends to be integrated in the crystal showing the peak at the center or the lattice constant tends to be lower. Accordingly, it is considered that Coulomb interaction in the crystal is increased, and heat resistance, chemical stability, electrochemical stability, and the like are also improved. In addition, although the lithium ion conductivity is slightly decreased by the heat treatment as compared with that before the heat treatment, the lithium ion conductivity still shows a high value as compared with the solid electrolyte in Example 3 containing only one kind of argyrodite crystal.

The reason why the lithium ion conductivity is increased by containing two or more argyrodite crystals is not clear, but the increase is achieved in the case of argyrodite crystals obtained by rapidly cooling after a melting step in the production of a solid electrolyte. Therefore, it is considered that, in the cooling process from the molten state, the seed crystal that is first precipitated is a high-temperature stable phase, and in the argyrodite crystal in which the seed crystal is grown as a nucleus, the presence site of a lithium ion, a sulfur anion, and a halogen anion is different from that of a crystal produced by a normal solid-phase reaction. In general, the high-temperature stable phase tends to have a high ion conductivity. It is considered that in the argyrodite crystal according to the present embodiment, a multi-composition argyrodite crystal containing the high-temperature stable phase is precipitated during cooling from the molten solution, therefore, a high lithium ion conductivity can be achieved.

Although the present invention has been described in detail with reference to specific embodiments, it is apparent to those skilled in the art that various changes and modifications can be made without departing from the spirit and scope of the present invention. The present application is based on Japanese Patent Application No. 2020-172693 filed on Oct. 13, 2020, the contents of which are incorporated herein by reference.

What is claimed is:

1. A sulfide solid electrolyte to be used in a lithium-ion secondary battery, the sulfide solid electrolyte comprising an argyrodite crystal structure represented by $Li_aPS_bHa_c$ (where 5≤a≤7, 4≤b≤6, and 0<c≤2, and Ha represents a halogen element), wherein in an X-ray diffraction spectrum using a Cu-Kα ray, the argyrodite crystal structure has a peak A and a peak B, each having a full width at half maximum of 0.07° or more, within a range of 2θ=30.3°±0.5°, and a difference between diffraction angles (2θ) of the peak A and the peak B is 0.05° or more; and in an X-ray diffraction spectrum using a Cu-Kα ray after a heat treatment is performed at a temperature of 400° C. or higher and a thermal decomposition temperature or lower for 1 hour, at least one phenomenon selected from the group consisting of the following (i), (ii) and (iii) is observed:

(i) a decrease in a peak intensity ratio of the peak A, (ii) an increase in a peak intensity ratio of the peak B, and (iii) an appearance of a peak C existing on a higher angle side than the peak A and on a lower angle side than the peak B, or an increase in a peak intensity ratio of the peak C.

2. The sulfide solid electrolyte according to claim 1, wherein the peak A and the peak B are peaks derived from two argyrodite crystal structures having lattice constants different from each other by 0.02 Å or more.

3. The sulfide solid electrolyte according to claim 1, wherein the peak C is present between the peak A and the peak B.

4. A sulfide solid electrolyte to be used in a lithium-ion secondary battery, the sulfide solid electrolyte comprising an argyrodite crystal structure represented by $Li_aPS_bHa_c$ (where 5≤a≤7, 4≤b≤6, and 0<c≤2, and Ha represents a halogen element), wherein in an X-ray diffraction spectrum using a Cu-Kα ray, the argyrodite crystal structure has a peak D and a peak E, each having a full width at half maximum of 0.07° or more, within a range of 2θ=30.3°±0.5°, a difference between diffraction angles (2θ) of the peak D and the peak E is 0.02° to 0.4°, and the X-ray diffraction spectrum is not changed even if a heat treatment is performed at a temperature of 400° C. or higher and a thermal decomposition temperature or lower for 1 hour.

5. A method for manufacturing a sulfide solid electrolyte to be used in a lithium-ion secondary battery, the method comprising:

mixing raw materials comprising Li, P, S and Ha, and heating and melting the raw materials; and then performing crystallization by rapid cooling under a normal pressure, wherein the Ha represents a halogen element, and the sulfide solid electrolyte comprises two or more different argyrodite crystal structures each represented by $Li_aPS_bHa_c$ (where 5≤a≤7, 4≤b≤6, and 0<c≤2, and Ha represents a halogen element).

6. The method for manufacturing a sulfide solid electrolyte according to claim 5, further comprising performing a heat treatment at 200° C. to 600° C. for 0.1 hours to 10 hours after the crystallization.

* * * * *